(12) United States Patent
Amer et al.

(10) Patent No.: US 12,130,256 B2
(45) Date of Patent: *Oct. 29, 2024

(54) FLEXIBLE AND ADAPTABLE HYBRID SENSOR FOR HTHA DETECTION

(71) Applicant: Saudi Arabian Oil Company, Dhahran (SA)

(72) Inventors: Ayman Amer, Thuwal (SA); Abdulwahab A. Halawani, Jeddah (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,392

(22) Filed: Apr. 7, 2022

(65) Prior Publication Data
US 2023/0324338 A1    Oct. 12, 2023

(51) Int. Cl.
*G01N 27/90*     (2021.01)
*G01N 27/904*    (2021.01)

(52) U.S. Cl.
CPC ....... *G01N 27/9006* (2013.01); *G01N 27/904* (2013.01); *G01N 27/9073* (2013.01)

(58) Field of Classification Search
None
See application file for complete search history.

(56) References Cited

U.S. PATENT DOCUMENTS

| | | | |
|---|---|---|---|
| 4,685,334 A | 8/1987 | Latimer | |
| 5,404,754 A * | 4/1995 | Wang | G01N 29/30 73/598 |
| 6,019,943 A * | 2/2000 | Buscemi | C23C 26/00 423/DIG. 8 |
| 6,125,704 A | 10/2000 | Wang | |
| 6,193,876 B1 | 2/2001 | Manolatos et al. | |

(Continued)

OTHER PUBLICATIONS

Vaganay Jerome et al; Systems, Methods and Apparatus for In-Service Tank Inspections; WO 2021102079 A1; Date Published May 27, 2021; CPC: G 01 N 27/9073 (Year: 2021).*

(Continued)

*Primary Examiner* — Nasima Monsur
(74) *Attorney, Agent, or Firm* — Fish & Richardson P.C.

(57) ABSTRACT

Systems and methods include a computer-implemented method for inspection. Removable sensors are installed on equipment used in hydrocarbon facilities at locations susceptible to high temperature hydrogen attack (HTHA). Attachment uses adaptable hybrid pads. Surface data captured using the sensors includes surface temperatures, per hydrogen (Ph) measurements, and methane measurements for methane escaping from external surfaces of the equipment. A presence of cracks in the equipment base metal is determined. An HTHA susceptibility analysis of the equipment is performed based on the presence of the cracks and by analyzing the surface data and mapping potential HTHA cracks and early signs of methane formation. The steps are repeated on other locations. An inspection result and assessment, generated using the captured surface data, includes a final analysis of assessment reports indicating a likelihood of cracks propagation and a presence of fissuring inside the equipment base metal.

20 Claims, 9 Drawing Sheets

(56) References Cited

U.S. PATENT DOCUMENTS

| | | |
|---|---|---|
| 2016/0103099 A1 | 4/2016 | Lott et al. |
| 2018/0335404 A1* | 11/2018 | Amer .................... B64C 39/024 |
| 2019/0360974 A1 | 11/2019 | Barshinger et al. |
| 2020/0286215 A1* | 9/2020 | Brill ........................ G06T 7/001 |
| 2021/0284923 A1 | 9/2021 | Koseoglu et al. |
| 2022/0196530 A1 | 6/2022 | Kinyon et al. |
| 2023/0324339 A1 | 10/2023 | Amer et al. |

OTHER PUBLICATIONS

Furtado Jader et al; Method for Detecting at Least One Fault Within a Ferromagnetic Structure; EP 3862738 A1; Date Published Aug. 11, 2021; CPC G 01 N 27/83 (Year: 2021).*

* cited by examiner

FLEXIBLE AND ADAPTABLE HYBRID SENSOR FOR HTHA DETECTION

TECHNICAL FIELD

The present disclosure applies to performing inspections on equipment used in the gas and oil industry.

BACKGROUND

Remote and online inspection techniques can be used in the oil and gas industry to achieve higher efficiency and improved integrity. For example, the detection and mitigation of high temperature hydrogen attack (HTHA) has been highlighted by facilities throughout the oil and gas sector as a critical inspection challenge, affecting potential financial losses and safety concerns. HTHA commonly occurs in process equipment that is exposed to hydrogen at high temperatures and pressures. Typical vulnerable assets include heat exchangers, piping equipment, and pressure vessels. The rapid deterioration of assets caused by HTHA is known to lead to process shutdowns of units and, in some cases, entire facilities.

HTHA is also a major issue in the refining and petrochemical industries. HTHA can occur in carbon and low-alloy steels which are exposed, for example, to a high partial pressure of hydrogen at elevated temperatures. In these types of cases, HTHA is the result of atomic hydrogen diffusing through the steel and reacting with carbides in the microstructure. This type of atomic hydrogen interacts with carbon to form methane gas. Since methane is a larger molecule and unable to diffuse out of the steel, pressure increases caused by the methane molecules typically form fissures and cracks.

Damage which occurs due to HTHA can be in the form of either internal decarburization and fissuring or surface decarburization, or both. Internal decarburization and fissuring results from the accumulation of methane gas at the carbide matrix interface. Surface decarburization results from the reaction of the atomic hydrogen with carbides at or near the surface where the methane gas can escape without causing fissures. Internal fissuring is more typically observed in carbon steel, e.g., C-½Mo steels and in Cr—Mo steels at higher hydrogen partial pressures. Surface decarburization is more commonly observed in Cr—Mo steels at higher temperatures and lower hydrogen partial pressures.

The early detection of HTHA is challenging. Current practices which are based on the conventional ultrasonic techniques for finding hydrogen attacks are insufficient at identifying hydrogen damage. For example, the hydrogen damage can occur against factors such as abnormal grain size, inclusions, rough surfaces, curved internal surfaces, cladding, laminar cracks, and variations of the transducer coupling conditions. Current practices are also not able to determine the extent of the damage progression.

SUMMARY

The present disclosure describes techniques for using sensors to detect High Temperature Hydrogen Attack (HTHA) conditions in oil and gas (O&G) operations. In some implementations, a computer-implemented method includes the following. Removable sensors are initiated that are installed at first locations on equipment base metal of equipment used in hydrocarbon facilities. The first locations include locations that are determined to be susceptible to high temperature hydrogen attack (HTHA). The removable sensors are attached to the equipment using adaptable hybrid pads. Surface data is captured using the removable sensors. The surface data includes surface temperatures, per hydrogen (Ph) measurements, and methane measurements for methane escaping from external surfaces of the equipment. A presence of cracks in the equipment base metal is determined using the surface data. An HTHA susceptibility analysis of the equipment is performed based, at least in part, on the presence of the cracks and by analyzing the surface data and mapping potential HTHA cracks and first locations of early signs of methane formation. The initiating, capturing, determining, and performing are repeated on second locations after removal of the removable sensors from the first locations and installation of the removable sensors at the second locations. An inspection result and assessment is generated using the captured surface data. The inspection result and assessment includes a final analysis of assessment reports indicating a likelihood of cracks propagation and a presence of fissuring inside the equipment base metal.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Techniques of the present disclosure can be used to solve the technical problem of inspection. For example, the techniques can be used to provide an online adaptable inspection sensing technique applicable in harsh environments capable of inspecting and detecting micro-cracking for early prediction of HTHA. Also, the techniques can provide risk-based inspection (RBI) of damaged mechanisms and can provide continuous monitoring associated with asset integrity. The techniques can provide an online inspection sensing technique applicable in harsh environments capable of inspecting and detecting stress-cracking for early prediction of HTHA with high-temperature adhesive mechanisms. The techniques can provide an adaptive apparatus that can be adhered to and re-installed at different locations. The techniques can provide apparatus mounting techniques including extended arm drones for elevated heights and extended arm rods for reaching distances. The techniques can provide the use of dry-coupled sensors to provide an online integrity assessment and to detect stress cracking associated with HTHA.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for using sensors to detect High Temperature Hydrogen Attack (HTHA) conditions in oil and gas (O&G) operations. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 3:
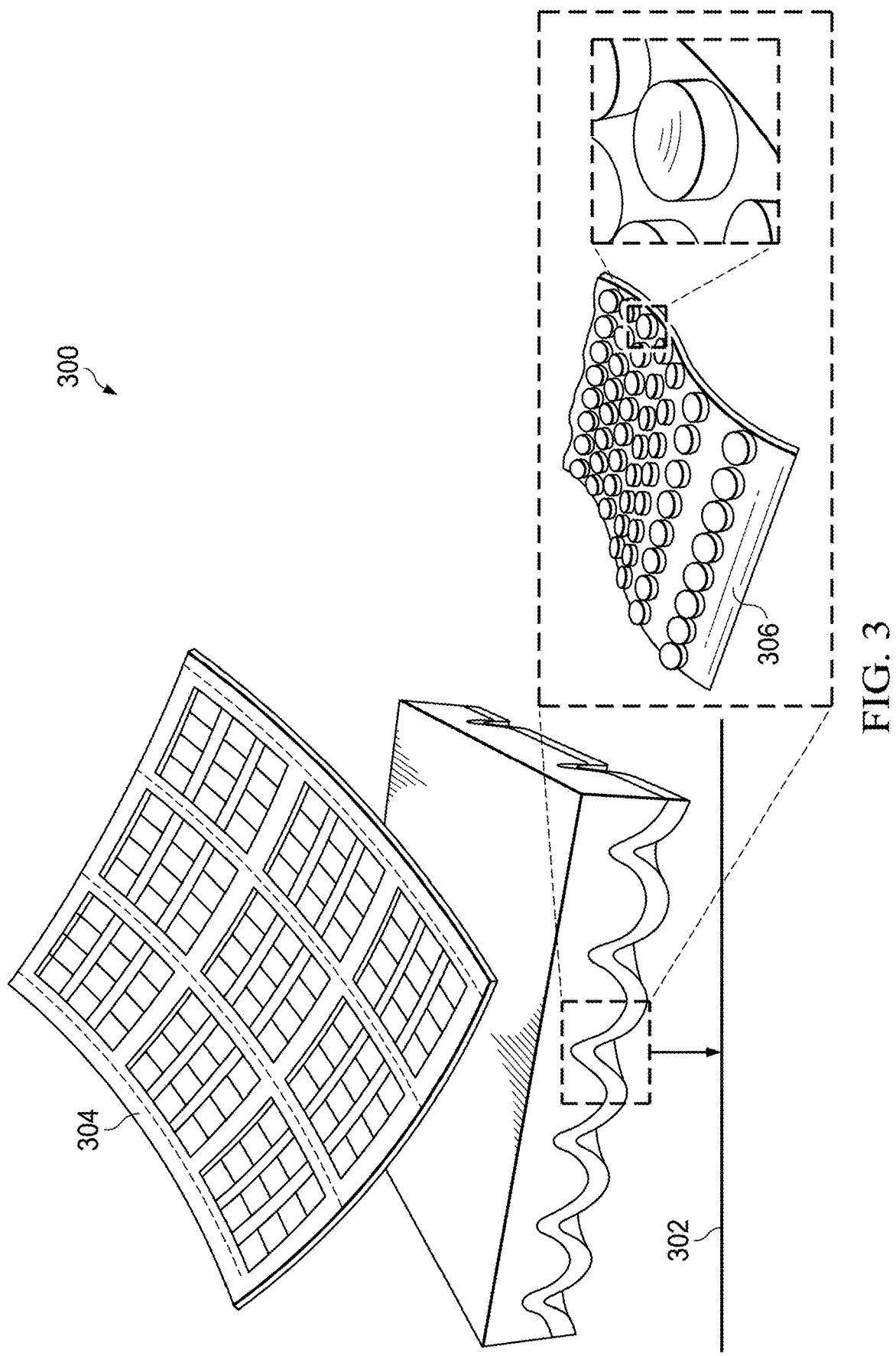
FIG. 3 illustrates an example of a hybrid sensor, according to some implementations of the present disclosure.
Figure 4:
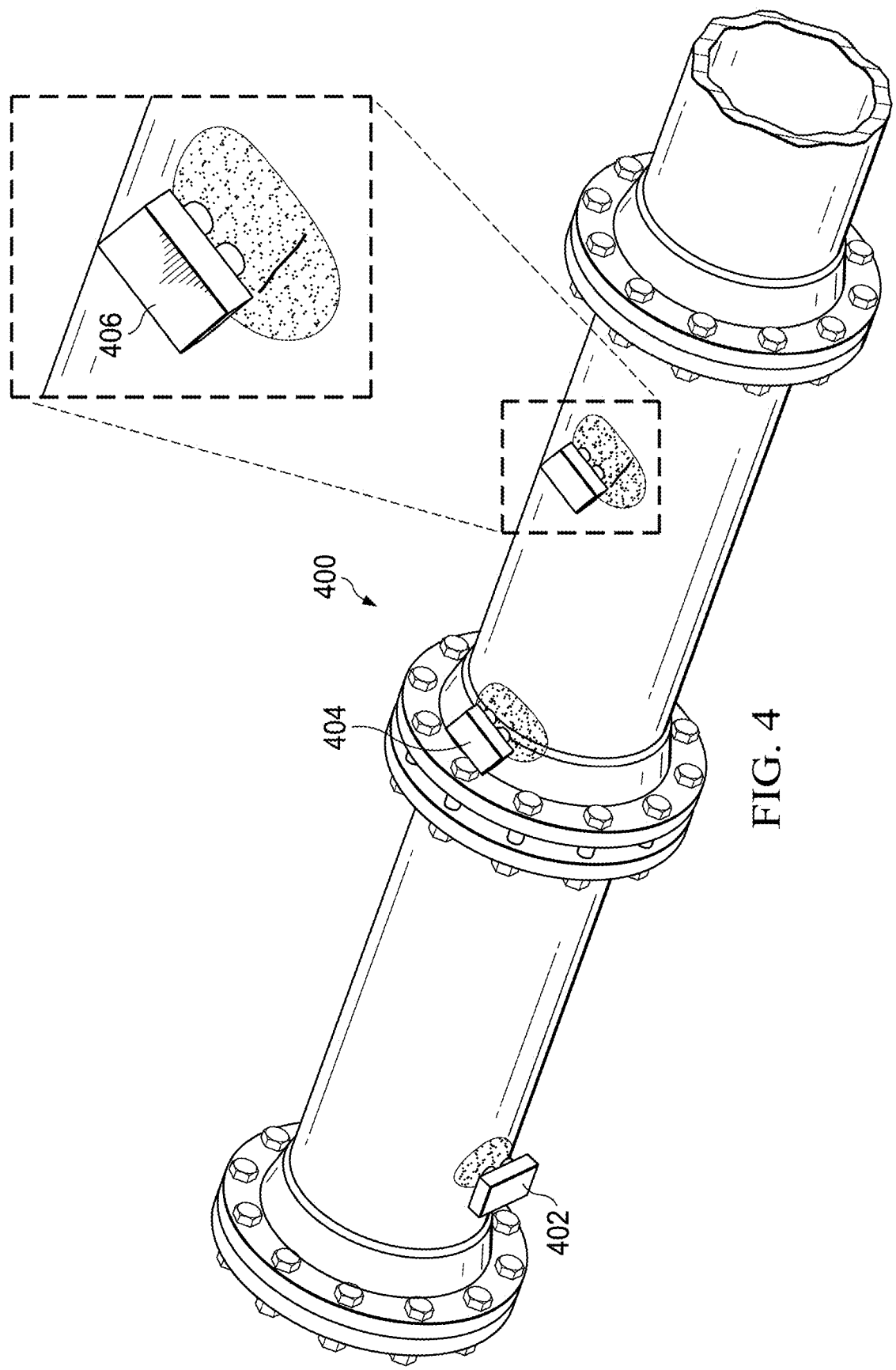
FIG. 4 illustrates an example of a hybrid sensor, according to some implementations of the present disclosure.

Techniques of the present disclosure can provide online sensing solutions applicable to harsh environments. The techniques can be based on adaptive hybrid sensor designs. For example, the designs can use both Pulsed Eddy Current (PEC) and pH sensors printed on smart material applicable for high-temperature range, known as MXenes. The technology can be used for inspecting and detecting the presence of cracking which provides an early prediction of HTHA. Sensors can provide inspection engineers with risk-based inspection (RBI) of HTHA damage, and continuous monitoring of the asset's integrity. Adaptive HTHA sensing pads can be developed and installed. The pads can be removed as needed and re-installed to inspect different locations. Installation can use at least two different mounting techniques, e.g., extended arm drone and manual extended arm rod, as shown in FIGS. 3 and 4, respectively. The pads can detect stress cracking associated with HTHA using an electromagnetic field penetrating through the inspected surface, and using a pH sensor measuring the level of methane escaping through the metal for accurate HTHA presence. In some implementations, the following tools can be used.

An inspection non-destructive testing (NDT) tool can be used for online and continuous monitoring based on the use of a micro pH rods/sensors based on metal oxide. This can be used to detect the change of pH on the surface of metal by measuring the potential voltage for early detection of symptoms related to HTHA (e.g., methane release from asset).

An inspection NDT tool can be used for online and continuous monitoring based on the use of PEC for the measurement and sizing of cracks and fissures, which are known causes of HTHA. In another example, an inspection NDT tool can be used for online and continuous monitoring based on the integration of a metal oxide pH and PEC sensor system. In this case, the inspection NDT tool can be used to detect micro-cracking caused by HTHA in heat exchangers, piping equipment, and pressure vessels, Naphtha Unifier/Hydro-treating reactors, commonly found in the oil and gas industry.

An inspection NDT tool can be used for online and continuous monitoring based on the integration of the metal oxide pH and PEC sensor system to detect micro-cracking caused by HTHA in carbon/carbon-½ molybdenum and low alloy chromium-molybdenum steels that are susceptible to HTHA. The inspection NDT tool can be used for online and continuous monitoring based on the integration of the metal oxide pH and PEC sensor system to detect micro-cracking caused by HTHA in heat-affected zones (HAZ) or the fusion line of welds.

The inspection NDT tool can be used with assets for both new and existing units in refineries known to be susceptible to HTHA (not limited to) catalytic reformers (platformer CCR/reniformer), diesel hydro-treaters, hydrogen plant related units operating at high temperature and pressure, and hydrocrackers. Temperature indicators (e.g., magnetic contact thermocouples) can be used to monitor operations of the locations in the operations that provide the most susceptible point to HTHA, and help to assure that operations remain within an integrity operating window.

Techniques can include the use of two phases that occur in a sequential and complementary fashion, e.g., in an integrated pH and PEC sensor system. A PEC phase can be used to target locations pre-identified by thermocouples. The PEC phase can contribute in reducing unnecessary inspections that might otherwise be necessary when to be done by PEC alone. The pH and PEC sensor system can be used in an integrated pH and PEC sensor system for online monitoring integrated on physically reconfigurable (flexible and stretchable) skin that is applicable in harsh environments (e.g., in high temperatures). The integrated pH and PEC sensor system can provide risk based inspection (RBI) of the HTHA damage mechanism and continuous monitoring of asset integrity. Inspection data collected from the hybrid sensory system can be communicated over a wireless communication mode (e.g., Bluetooth, Wi-Fi) to an onsite computer system for further processing.

Techniques can be used that implement hybrid concept of sensing the external characterization of assets' material and inspection of the micro-cracks, capable of sensing an initial growth of the HTHA with adaptable function. Flexible sensors can sense and detect HTHA micro-cracks by adhesion force based on high-temperature suction substrate capable of adhering up to 752° F. (400° C.) during inspection processes. Techniques can include the use of a combination of high-temperature suction pads and an array of electromagnetic (EM) sensors. A process of using these pads includes first inspecting an initial spot and then detaching from the initial spot to inspect a second spot and stay adhered to it. This type of hybrid sensory system can be used to take measurements from a spot that was previously inspected. The process can be repeated until all spot checks are completed. The inspection areas can be selected by the field to target the most susceptible areas for which to inspect and monitor HTHA over time for high-accuracy detection (e.g., heat-affected zones (HAZ) and fusion lines of welds).

Online monitoring can be used on an integrated and physically reconfigurable (flexible and stretchable) skin that is applicable in harsh environments (e.g., high temperatures). Advanced materials that are used include a composite of the water-containing hydrogel and a metal-carbide compound known as MXene. MXenes are known to be highly-conductive materials, which have demonstrated state-of-the-art performance in electromagnetic sensing, chemical sensing, and energy storage. MXenes also possess intriguing physics and chemistry properties at high temperatures, e.g., up to 600° C. MXenes can also adhere to many surfaces and can exhibit exceptional properties for electronic and sensing applications. For example, the properties of such advanced materials can include mechanical strength, flexibility (e.g., while being thin and light), heat insulation, and electronic properties.

Some implementations can include processes used to integrate a sensing solution that can examine (e.g., through an online system) equipment that is operating at high temperatures to detect early stages of HTHA during contact with the equipment. Some implementations can facilitate the simulation of inspection processes of surface temperatures and pH measurements. Some implementations can include a central thermocouples sensor with a surrounding array of electromagnetic (EM) sensors that are articulated and passively adjustable based on surface shapes.

Some implementations can include the use of thin flexible EM array sensors, which can be used for the online measurements of micro-cracks between large metallic surfaces affected by the HTHA. The sensors can be implemented as a set of spiral sensor coils, for example. An advantage of using an array probe is that, instead of scanning the probe mechanically over a surface, multiple elements can provide a uniformly-spaced scan one width of the surface, giving a nearly equal sensitivity over a surface profile. This, in turn, can reduce the requirement for accurate and fast scanning and can allow for comparisons between responses from different array elements. Generally, the elementary coils used in an EM array can have characteristics similar to those of standard coils in their size, sensitivity and accuracy. This can achieve an increase of a scanning speed and a better diagnosis quality and reliability. As a result, the techniques can provide a much smaller and more compact packaging for the sensory system for detecting HTHA micro-cracks and can allow for simultaneously taking surface temperatures and pH measurements for HTHA inspection.

The multiple elements can provide an adaptable mechanical adhesive solution that will help for easy readjust the targeted location for micro-cracks detection. Suction compartments can be passive, not needing to be powered by an independent pump or external device. A resulting hybrid sensory system can be conducted with a permanent adhesive to the equipment at selected localized spots using high-temperature, air-drying refractory adhesive materials for continuous monitoring and detection.

Figure 1:
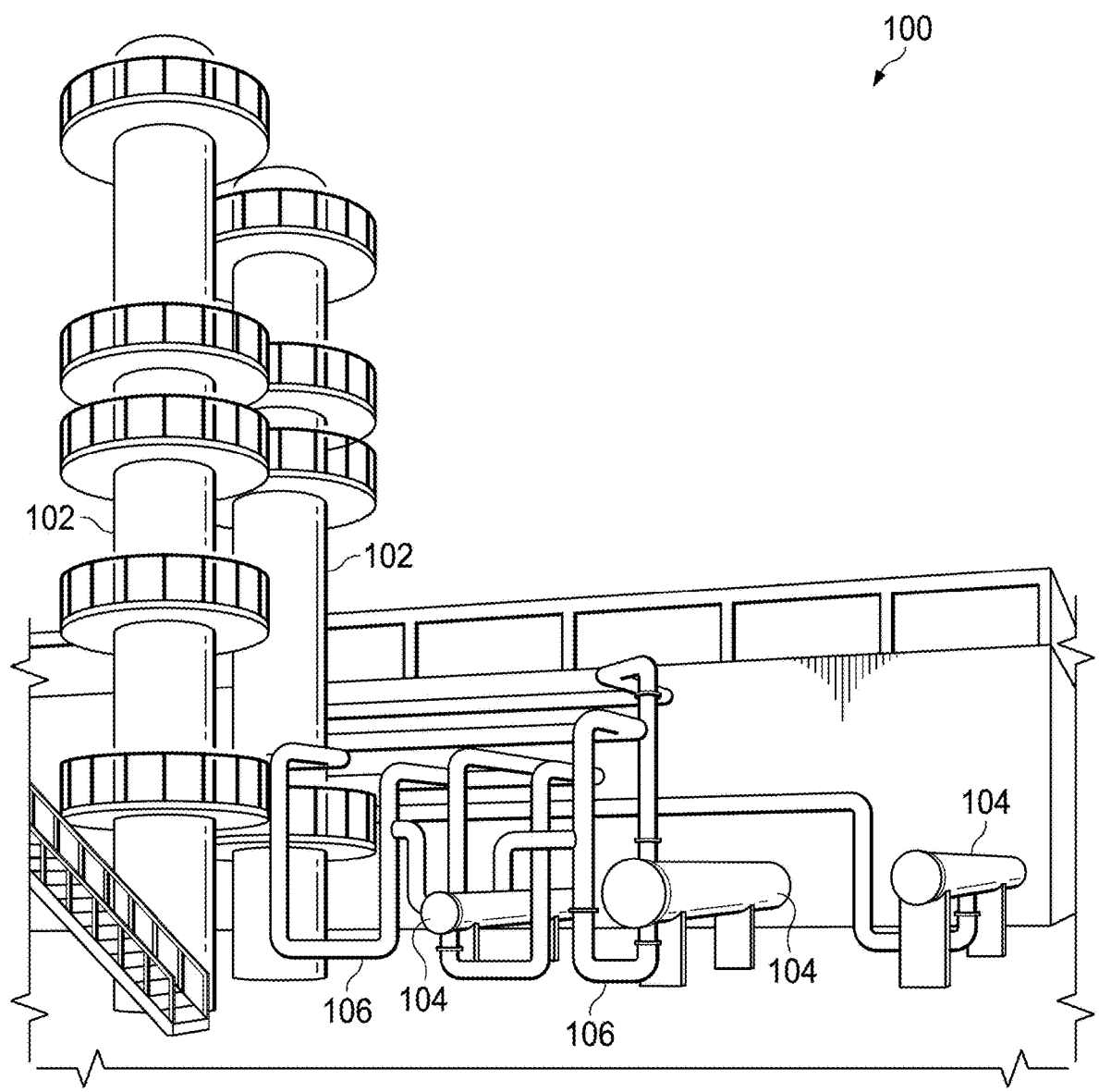
FIG. 1 is a diagram showing an example of a refinery facility including pressure vessels, heat exchangers, and piping equipment, according to some implementations of the present disclosure.

FIG. 1 is a diagram showing an example of a refinery facility 100 including pressure vessels 102, heat exchangers 104, and piping equipment 106, according to some implementations of the present disclosure. The refinery facility 100 may be susceptible to HTHA damage, for example.

Figure 2C:
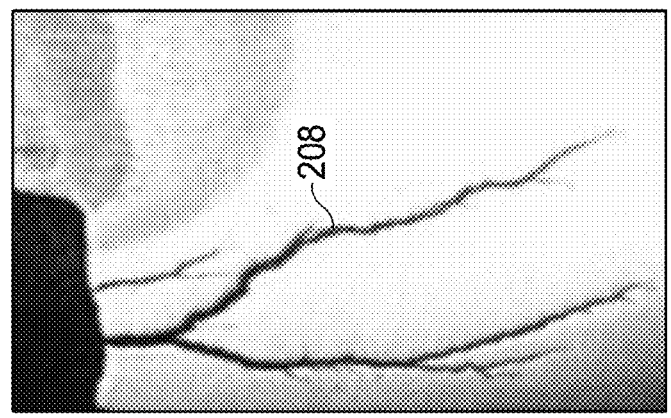
FIGS. 2A-2C are images showing examples of stress cracks corresponding to a high temperature hydrogen attack (HTHA), according to some implementations of the present disclosure.
Figure 2B:
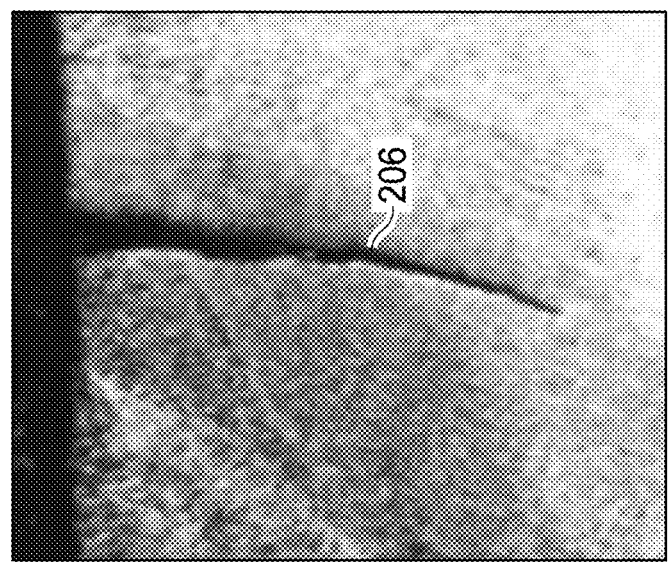
Figure 2A:
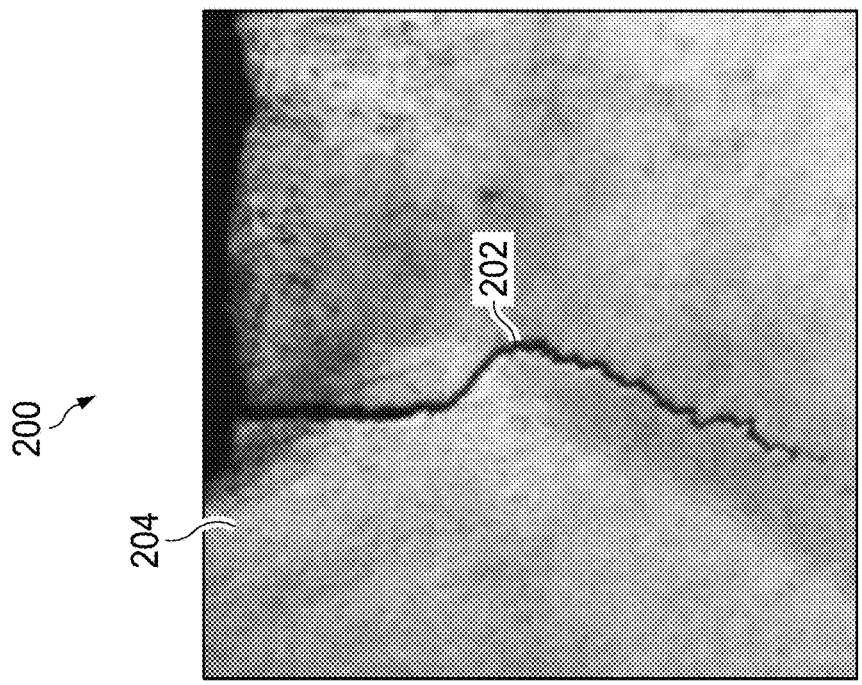

FIGS. 2A-2C are images showing examples of stress cracks 202, 206, and 208 corresponding to a high temperature hydrogen attack (HTHA) 204, according to some implementations of the present disclosure.

FIG. 3 illustrates an example of a hybrid sensor 300, according to some implementations of the present disclosure. The hybrid sensor 300 can be used on an HTMA surface 302. The hybrid sensor 300 can include adaptable adhesion mechanisms at different inspection locations. The hybrid sensor 300 can include a PEC array 304 for detecting HTHA micro-cracks and a high-temperature suction skin 306. Other adhesion mechanisms can include, for example, suction cups, high temperature magnets, and mechanical locks.

FIG. 4 illustrates an example of a hybrid sensor 400, according to some implementations of the present disclosure. The hybrid sensor system 400 includes a sensor 402 at a 6 o'clock position, a sensor 404 for detecting anomalies around a weld HAZ, and a sensor 406 for detecting micro-cracks as shown in FIGS. 2A-2C. The sensors 402-406 provide adaptive hybrid pad components for anomaly detection at different locations.

As shown in FIG. 3, it is preferred to have a combination of thermocouples and per hydrogen (pH) sensors to capture the surface temp/pH reading at the same time when detecting the HTHA micro-cracks to reduce the time compared to performing each task separately. In some implementations, a single type of thermocouples or pH probe can also be used instead of many. Pulsed Eddy Current (PEC), EMAT, or any other Electromagnetic probe can be used to detect the effect of HTHA micro-cracks. Pads can be adapted and relocated from one location to another.

Figure 5:
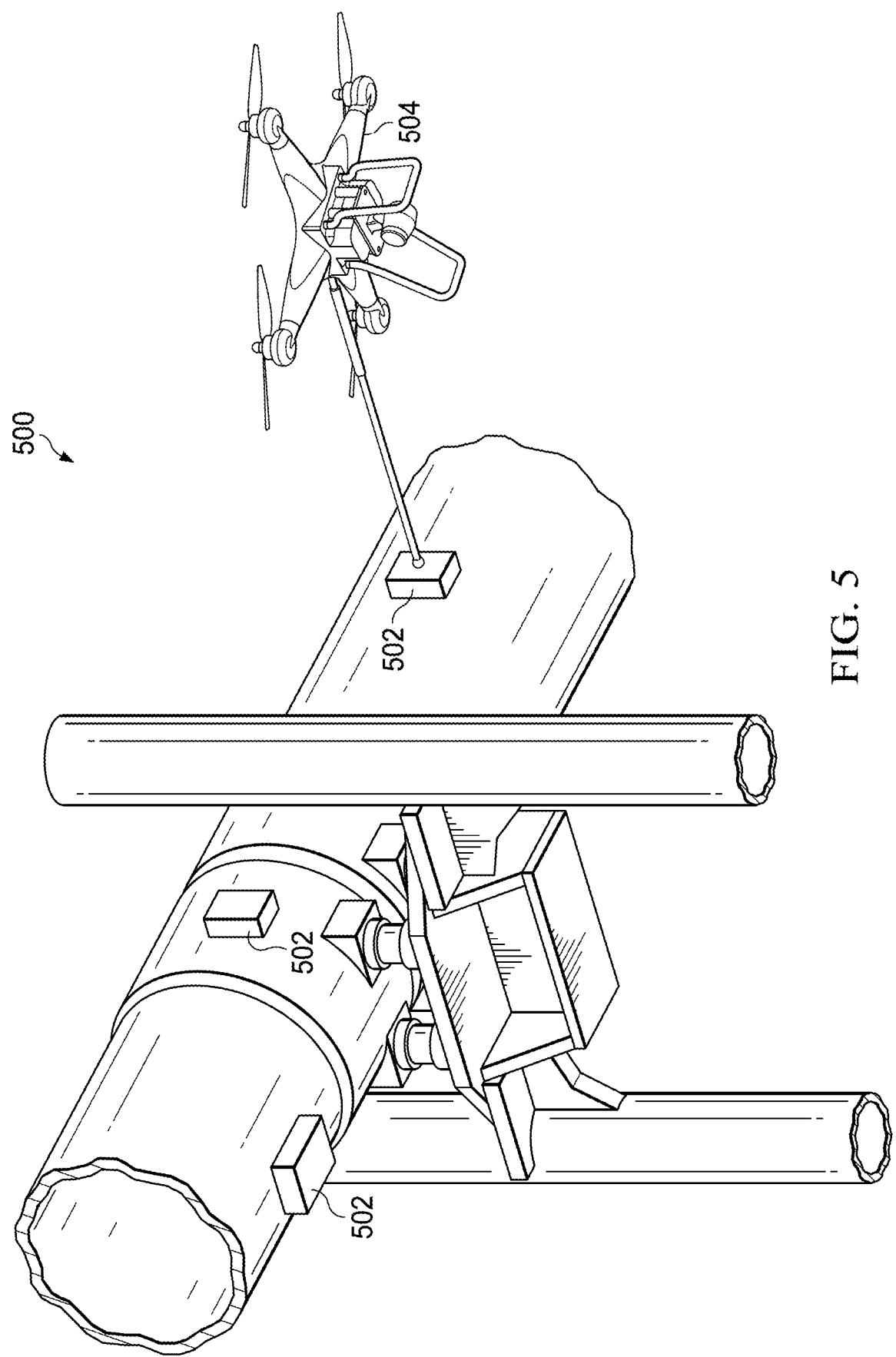
FIG. 5 illustrates an example of an HTHA flexible hybrid sensory system mounting technique using a drone, according to some implementations of the present disclosure.

FIG. 5 illustrates an example of an HTHA flexible hybrid sensory system mounting technique 500 using a drone, according to some implementations of the present disclosure. The technique 500 can be used for installing sensors 502 in elevated spots, for example, installed using extended arm drones 504.

Figure 6:
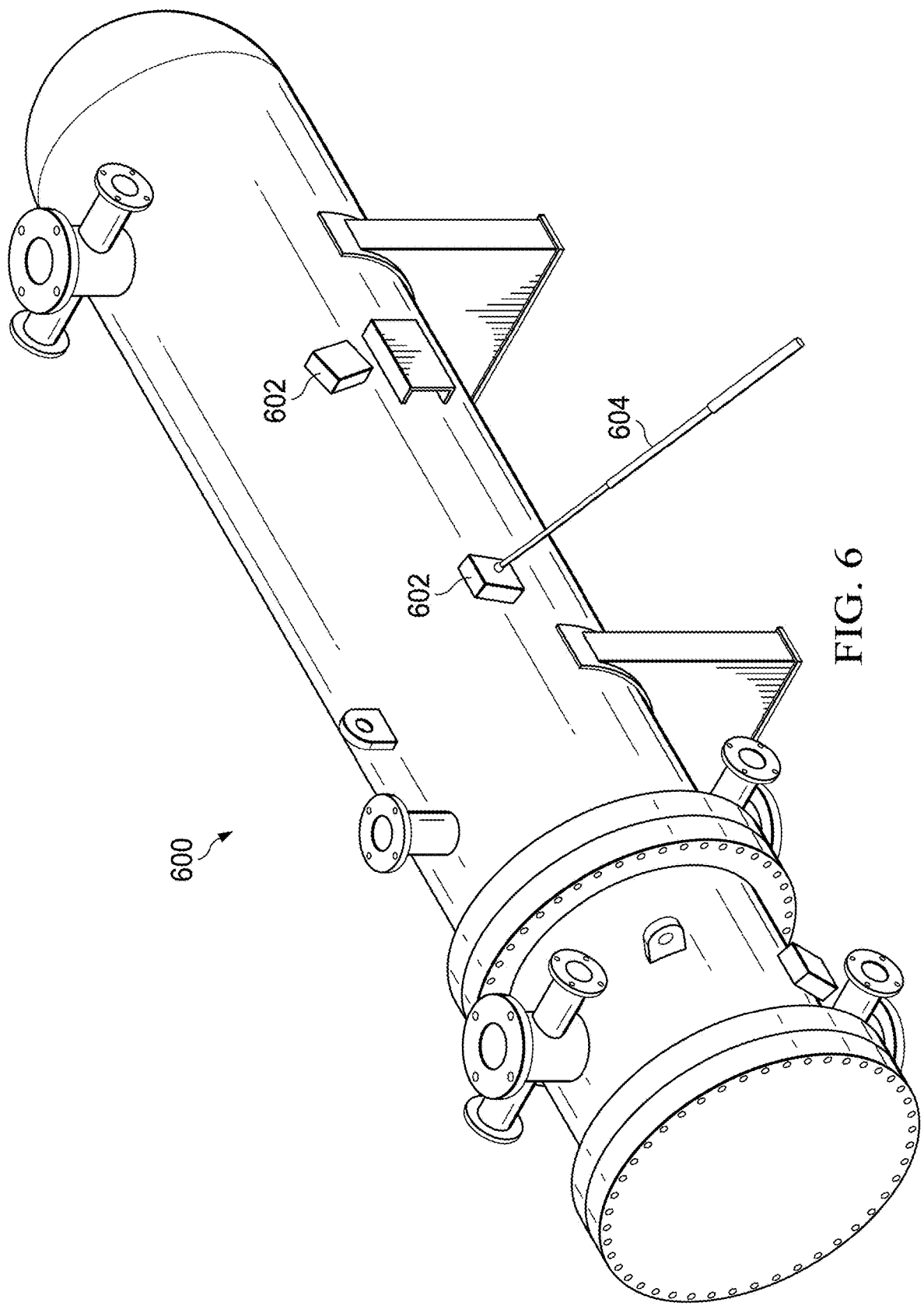
FIG. 6 illustrates an example of an HTHA flexible hybrid sensory system mounting technique, according to some implementations of the present disclosure.

FIG. 6 illustrates an example of an HTHA flexible hybrid sensory system mounting technique 600, according to some implementations of the present disclosure. The technique 600 can be used to install (and optionally remove) sensors 602 using an extended arm 604, e.g., operated by a person standing on a surface nearby.

Figure 7:
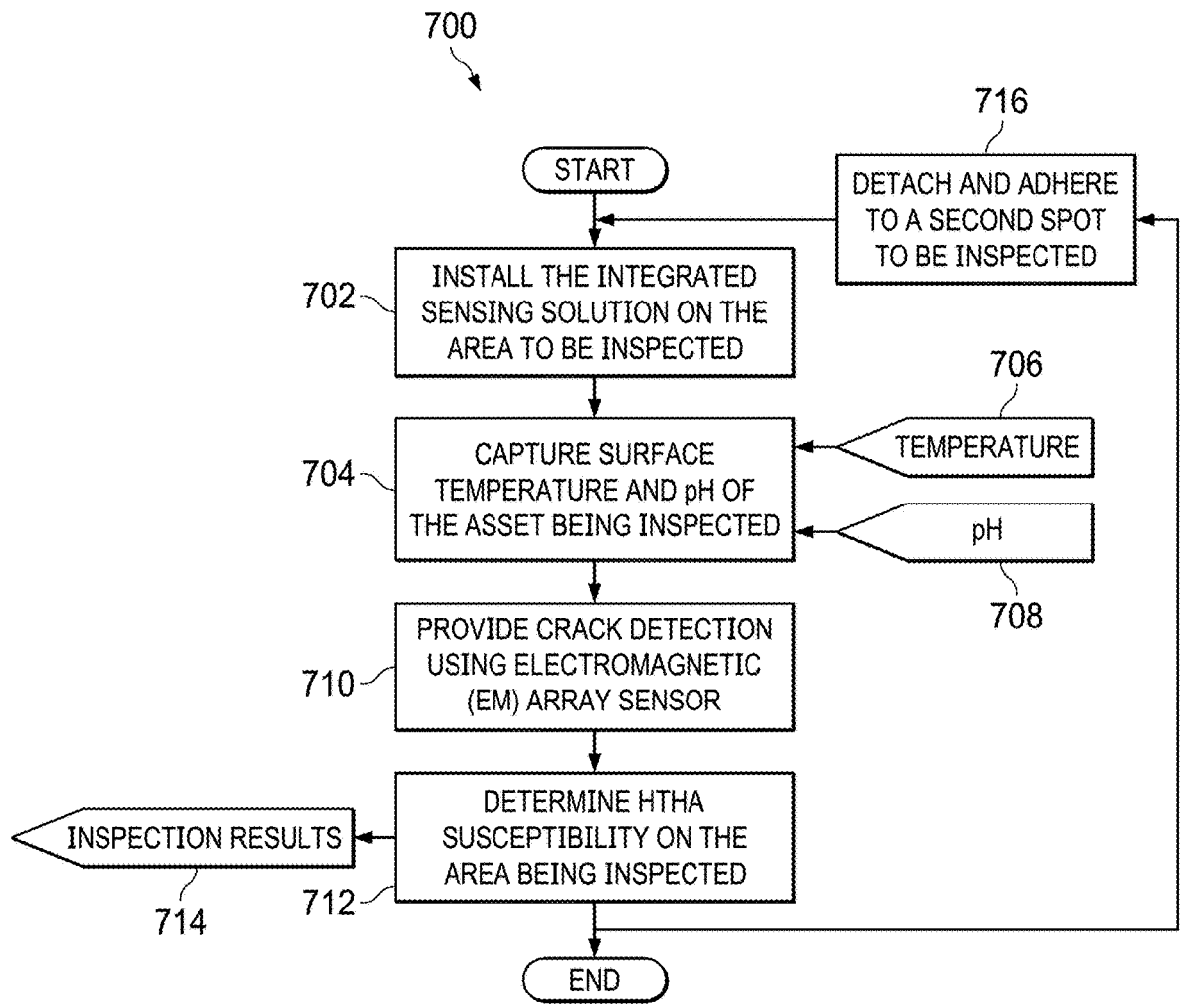
FIG. 7 is a flow chart of an example of a workflow for using an HTHA hybrid sensory system to inspect assets susceptible to HTHA corrosion, according to some implementations of the present disclosure.

FIG. 7 is a flow chart of an example of a workflow 700 for using an HTHA hybrid sensory system to inspect assets susceptible to HTHA corrosion, according to some implementations of the present disclosure. The workflow 700 provides a measurement process for inspection of micro-cracking and HTHA detection.

At 702, sensor installation is performed, including identification of a selected location by field inspection and engineers. The selected location is made to consider that adaptable hybrid pads can be adhered to susceptible spots of equipment base metal based on equipment history.

At 704, surface temperature 706 and pH 708 are captured. The process includes a fusion sensory technique in which a surface temperature is collected, and a measurement is made of any methane presence escaping from the external surface on the metal.

At 710, the presence of cracks is determined. For example, the PEC array sensor can be used to collect data and indicate potential micro-cracks and initial growth at the locations of the mounted adaptable pads.

At 712, HTHA susceptibility is determined. Collected data can be analyzed in order to map out potential HTHA cracks and determine early signs of methane formation.

At 714, an inspection result and assessment are generated. The final analysis can be utilized to provide assessment reports indicating the possibility of cracks propagation and the presence of fissuring inside the base metal.

At 716, the adaptable pads can be detached and adhered to a second spot to be inspected. This can occur, for example, when sufficient data is captured and the initial locations of the pads.

Figure 8:
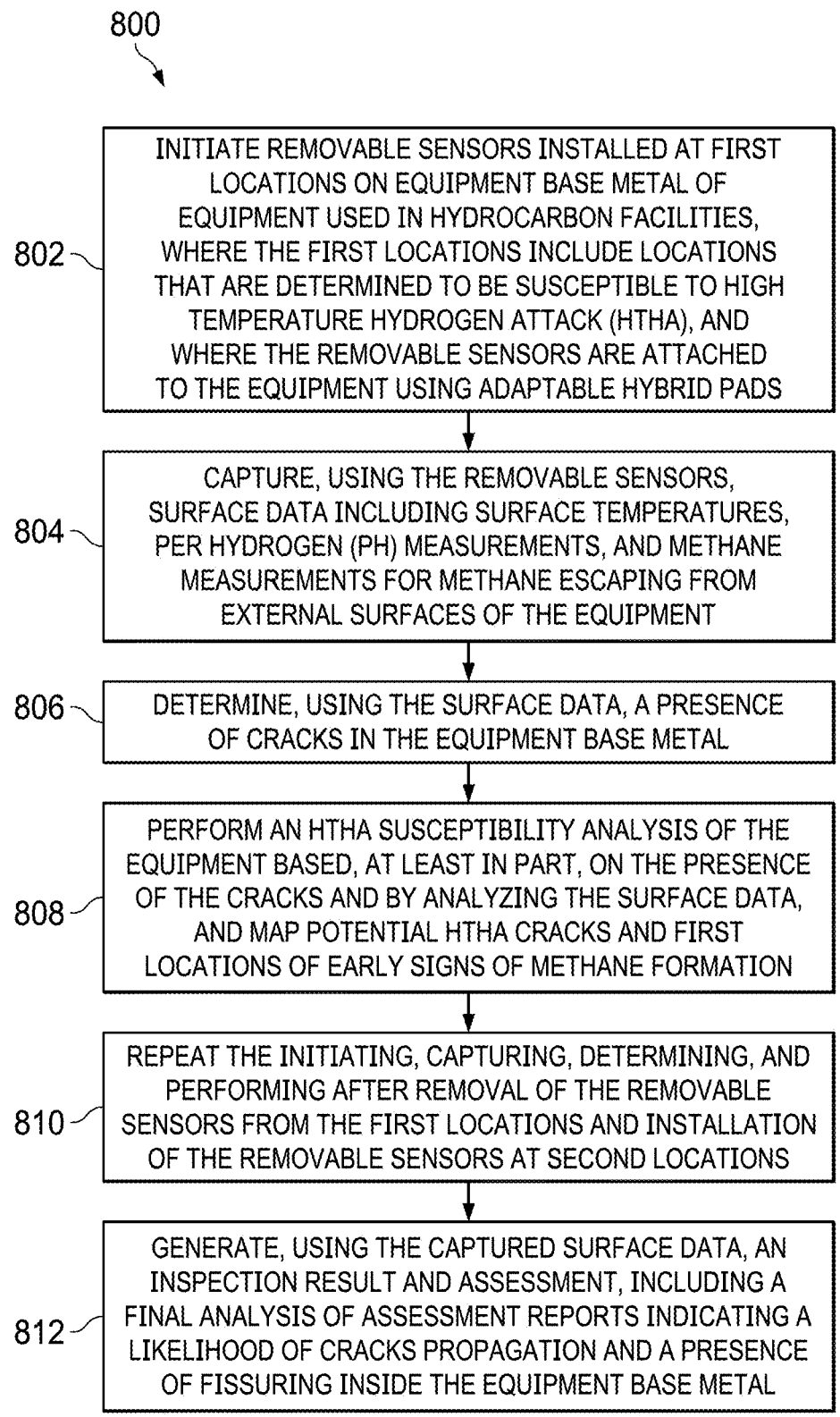
FIG. 8 is a flowchart of an example of a method for generating an inspection result and assessment regarding HTHA conditions, according to some implementations of the present disclosure.

FIG. 8 is a flowchart of an example of a method 800 for generating an inspection result and assessment regarding HTHA conditions, according to some implementations of the present disclosure. For clarity of presentation, the description that follows generally describes method 800 in the context of the other figures in this description. However, it will be understood that method 800 can be performed, for example, by any suitable system, environment, software, and hardware, or a combination of systems, environments, software, and hardware, as appropriate. In some implementations, various steps of method 800 can be run in parallel, in combination, in loops, or in any order.

At 802, removable sensors are initiated that are installed at first locations on equipment base metal of equipment used in hydrocarbon facilities. The first locations include locations that are determined to be susceptible to high temperature hydrogen attack (HTHA). For example, determining that the first locations include locations that are susceptible to HTHA can be based, at least in part, on an equipment history of the equipment. The removable sensors are attached to the equipment using adaptable hybrid pads. From 802, method 800 proceeds to 804.

At 804, surface data is captured using the removable sensors. The surface data includes surface temperatures, per hydrogen (Ph) measurements, and methane measurements for methane escaping from external surfaces of the equipment. For example, capturing the surface data includes using wireless communications of the surface data from the removable sensors to an onsite computer system. In some implementations, capturing the surface data can include recording, with the surface data for each removable sensor, a location on the equipment on which the removable sensor is installed. From 804, method 800 proceeds to 806.

At 806, a presence of cracks in the equipment base metal is determined using the surface data. For example, analysis of the surface data can result in the identification of the cracks shown in FIGS. 2A-2C that are present on equipment at the refinery facility 100. From 806, method 800 proceeds to 808.

At 808, an HTHA susceptibility analysis of the equipment is performed based, at least in part, on the presence of the cracks and by analyzing the surface data and mapping potential HTHA cracks and first locations of early signs of methane formation. From 808, method 800 proceeds to 810.

At 810, the initiating, capturing, determining, and performing are repeated on second locations after removal of the removable sensors from the first locations and installation of the removable sensors at the second locations. The first locations and the second locations can be selected using field inspection and engineers. From 810, method 800 proceeds to 812.

At 812, an inspection result and assessment is generated using the captured surface data. The inspection result and assessment includes a final analysis of assessment reports indicating a likelihood of cracks propagation and a presence of fissuring inside the equipment base metal. After 812, method 800 can stop.

In some implementations, in addition to (or in combination with) any previously-described features, techniques of the present disclosure can include the following. Customized user interfaces can present intermediate or final results of the above described processes to a user. The presented information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change or an improvement in drilling parameters (including speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 9:
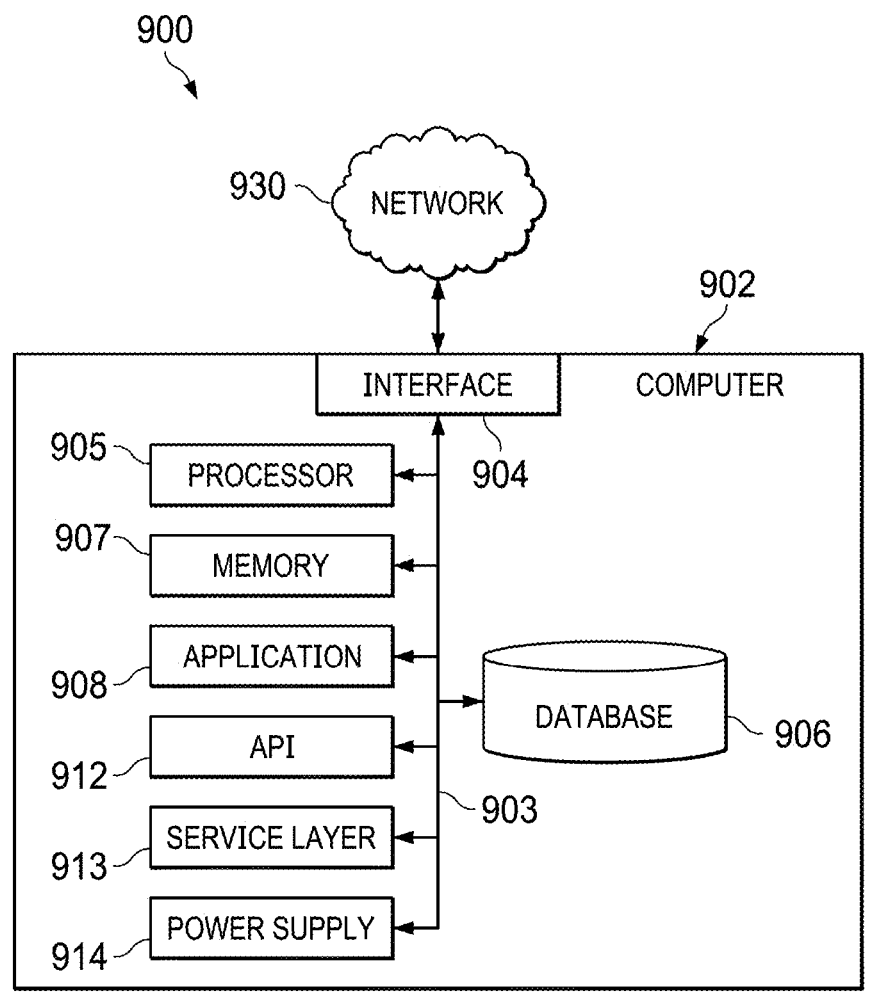
FIG. 9 is a block diagram illustrating an example computer system used to provide computational functionalities associated with described algorithms, methods, functions, processes, flows, and procedures as described in the present disclosure, according to some implementations of the present disclosure.

FIG. 9 is a block diagram of an example computer system 900 used to provide computational functionalities associated with described algorithms, methods, functions, processes, flows, and procedures described in the present disclosure, according to some implementations of the present disclosure. The illustrated computer 902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI).

The computer 902 can serve in a role as a client, a network component, a server, a database, a persistency, or components of a computer system for performing the subject matter described in the present disclosure. The illustrated computer 902 is communicably coupled with a network 930. In some implementations, one or more components of the computer 902 can be configured to operate within different environments, including cloud-computing-based environments, local environments, global environments, and combinations of environments.

At a top level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 903. In some implementations, any or all of the components of the computer 902, including hardware or software components, can interface with each other or the interface 904 (or a combination of both) over the system bus 903. Interfaces can use an application programming interface (API) 912, a service layer 913, or a combination of the API 912 and service layer 913. The API 912 can include specifications for routines, data structures, and object classes. The API 912 can be either computer-language independent or dependent. The API 912 can refer to a complete interface, a single function, or a set of APIs.

The service layer 913 can provide software services to the computer 902 and other components (whether illustrated or not) that are communicably coupled to the computer 902. The functionality of the computer 902 can be accessible for all service consumers using this service layer. Software services, such as those provided by the service layer 913, can provide reusable, defined functionalities through a defined interface. For example, the interface can be software written in JAVA, C++, or a language providing data in extensible markup language (XML) format. While illustrated as an integrated component of the computer 902, in alternative implementations, the API 912 or the service layer 913 can be stand-alone components in relation to other components of the computer 902 and other components communicably coupled to the computer 902. Moreover, any or all parts of the API 912 or the service layer 913 can be implemented as child or sub-modules of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 also includes a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

The application 908 can be an algorithmic software engine providing functionality according to particular needs, desires, or particular implementations of the computer 902 and the described functionality. For example, application 908 can serve as one or more components, modules, or applications. Further, although illustrated as a single application 908, the application 908 can be implemented as multiple applications 908 on the computer 902. In addition, although illustrated as internal to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power supply 914 can include a power plug to allow the computer 902 to be plugged into a wall socket or a power source to, for example, power the computer 902 or recharge a rechargeable battery.

There can be any number of computers 902 associated with, or external to, a computer system containing computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Described implementations of the subject matter can include one or more features, alone or in combination.

For example, in a first implementation, a computer-implemented method includes the following. Removable sensors are initiated that are installed at first locations on equipment base metal of equipment used in hydrocarbon facilities. The first locations include locations that are determined to be susceptible to high temperature hydrogen attack (HTHA). The removable sensors are attached to the equipment using adaptable hybrid pads. Surface data is captured using the removable sensors. The surface data includes surface temperatures, per hydrogen (Ph) measurements, and methane measurements for methane escaping from external surfaces of the equipment. A presence of cracks in the equipment base metal is determined using the surface data. An HTHA susceptibility analysis of the equipment is performed based, at least in part, on the presence of the cracks and by analyzing the surface data and mapping potential HTHA cracks and first locations of early signs of methane formation. The initiating, capturing, determining, and performing are repeated on second locations after removal of the removable sensors from the first locations and installation of the removable sensors at the second locations. An inspection result and assessment is generated using the captured surface data. The inspection result and assessment includes a final analysis of assessment reports indicating a likelihood of cracks propagation and a presence of fissuring inside the equipment base metal.

The foregoing and other described implementations can each, optionally, include one or more of the following features:

A first feature, combinable with any of the following features, where the removable sensors include a pulsed eddy current (PEC) array.

A second feature, combinable with any of the previous or following features, where the removable sensors include high-temperature suction skins including suction cups.

A third feature, combinable with any of the previous or following features, where capturing the surface data includes using wireless communications of the surface data from the removable sensors to an onsite computer system.

A fourth feature, combinable with any of the previous or following features, where the first locations and the second locations are selected using field inspection and engineers.

A fifth feature, combinable with any of the previous or following features, where capturing the surface data includes recording, with the surface data for each removable sensor, a location on the equipment on which the removable sensor is installed.

A sixth feature, combinable with any of the previous or following features, the method further including determining, based at least on an equipment history of the equipment, that the first locations include locations that are susceptible to HTHA.

In a second implementation, a non-transitory, computer-readable medium stores one or more instructions executable by a computer system to perform operations including the following. Removable sensors are initiated that are installed at first locations on equipment base metal of equipment used in hydrocarbon facilities. The first locations include locations that are determined to be susceptible to high temperature hydrogen attack (HTHA). The removable sensors are attached to the equipment using adaptable hybrid pads. Surface data is captured using the removable sensors. The surface data includes surface temperatures, per hydrogen (Ph) measurements, and methane measurements for methane escaping from external surfaces of the equipment. A presence of cracks in the equipment base metal is determined using the surface data. An HTHA susceptibility analysis of the equipment is performed based, at least in part, on the presence of the cracks and by analyzing the surface data and mapping potential HTHA cracks and first locations of early signs of methane formation. The initiating, capturing, determining, and performing are repeated on second locations after removal of the removable sensors from the first locations and installation of the removable sensors at the second locations. An inspection result and assessment is generated using the captured surface data. The inspection result and assessment includes a final analysis of assessment reports indicating a likelihood of cracks propagation and a presence of fissuring inside the equipment base metal.

The foregoing and other described implementations can each, optionally, include one or more of the following features:

A first feature, combinable with any of the following features, where the removable sensors include a pulsed eddy current (PEC) array.

A second feature, combinable with any of the previous or following features, where the removable sensors include high-temperature suction skins including suction cups.

A third feature, combinable with any of the previous or following features, where capturing the surface data includes using wireless communications of the surface data from the removable sensors to an onsite computer system.

A fourth feature, combinable with any of the previous or following features, where the first locations and the second locations are selected using field inspection and engineers.

A fifth feature, combinable with any of the previous or following features, where capturing the surface data includes recording, with the surface data for each removable sensor, a location on the equipment on which the removable sensor is installed.

A sixth feature, combinable with any of the previous or following features, the operations further including determining, based at least on an equipment history of the equipment, that the first locations include locations that are susceptible to HTHA.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. Removable sensors are initiated that are installed at first locations on equipment base metal of equipment used in hydrocarbon facilities. The first locations include locations that are determined to be susceptible to high temperature hydrogen attack (HTHA). The removable sensors are attached to the equipment using adaptable hybrid pads. Surface data is captured using the removable sensors. The surface data includes surface temperatures, per hydrogen (Ph) measurements, and methane measurements for methane escaping from external surfaces of the equipment. A presence of cracks in the equipment base metal is determined using the surface data. An HTHA susceptibility analysis of the equipment is performed based, at least in part, on the presence of the cracks and by analyzing the surface data and mapping potential HTHA cracks and first locations of early signs of methane formation. The initiating, capturing, determining, and performing are repeated on second locations after removal of the removable sensors from the first locations and installation of the removable sensors at the second locations. An inspection result and assessment is generated using the captured surface data. The inspection result and assessment includes a final analysis of assessment reports indicating a likelihood of cracks propagation and a presence of fissuring inside the equipment base metal.

The foregoing and other described implementations can each, optionally, include one or more of the following features:

A first feature, combinable with any of the following features, where the removable sensors include a pulsed eddy current (PEC) array.

A second feature, combinable with any of the previous or following features, where the removable sensors include high-temperature suction skins including suction cups.

A third feature, combinable with any of the previous or following features, where capturing the surface data includes using wireless communications of the surface data from the removable sensors to an onsite computer system.

A fourth feature, combinable with any of the previous or following features, where the first locations and the second locations are selected using field inspection and engineers.

A fifth feature, combinable with any of the previous or following features, where capturing the surface data includes recording, with the surface data for each removable sensor, a location on the equipment on which the removable sensor is installed.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    installing, using at least one drone configured with an extended arm, removable sensors at first locations on base metal of equipment used in hydrocarbon facilities, wherein the first locations comprise locations that are identified as being susceptible to formation of microcracks due to high temperature hydrogen attack (HTHA) based on a history of the equipment, and wherein the removable sensors are attached to the equipment at elevated heights on the equipment using adaptable hybrid pads, the removable sensors detecting the microcracks by adhesion force based on a high-temperature suction substrate adhering up to a set temperature during an inspection processes;
    capturing, using the removable sensors and as captured surface data, surface data comprising surface temperatures, per hydrogen (pH) measurements, and methane measurements for methane escaping from external surfaces of the equipment;
    determining, using the captured surface data, a presence of the microcracks in the base metal;
    performing an HTHA susceptibility analysis of the equipment based, at least in part, on the presence of the microcracks and by analyzing the captured surface data;
    mapping, based at least on the HTHA susceptibility analysis, potential HTHA microcracks and first methane formation locations presenting early signs of methane formation;
    installing, using the at least one drone configured with the extended arm, the removable sensors at second locations on the base metal of equipment used in hydrocarbon facilities, wherein the second locations comprise locations that are identified as being susceptible to formation of the microcracks due to the HTHA based on a history of the equipment;
    capturing, using the removable sensors and as the captured surface data, the surface data comprising the pH measurements, and the methane measurements for the methane escaping from external surfaces of the equipment;
    determining, using the captured surface data, the presence of the microcracks in the base metal;
    performing microcracks HTHA susceptibility analysis of the equipment based, at least in part, on the presence of the microcracks and by analyzing the captured surface data;
    mapping, based at least on the HTHA susceptibility analysis, potential HTHA microcracks and second methane formation locations; and
    generating, using the captured surface data, an inspection result and a suggestion, the inspection result comprising a final analysis of assessment reports indicating a likelihood of microcracks propagation and a presence of fissuring inside the base metal and the suggestion comprising a modification of an operation of the equipment to prevent risks indicated by the inspection result.

2. The computer-implemented method of claim 1, wherein the removable sensors comprise a pulsed eddy current (PEC) array.

3. The computer-implemented method of claim 1, wherein the removable sensors comprise high-temperature suction skins including suction cups.

4. The computer-implemented method of claim 1, wherein capturing the surface data comprises using wireless communications of the surface data from the removable sensors to an onsite computer system.

5. The computer-implemented method of claim 1, wherein the first locations and second locations are selected using field inspection and engineers.

6. The computer-implemented method of claim 1, wherein capturing the surface data comprises recording, with the surface data for each removable sensor, a location on the equipment on which the removable sensor is installed.

7. The computer-implemented method of claim 1, further comprising:
    determining, based at least on an equipment history of the equipment, that the first locations comprise locations that are susceptible to HTHA.

8. A non-transitory, computer-readable medium storing one or more instructions executable by a computer system to perform operations comprising:
    installing, using at least one drone configured with an extended arm, removable sensors at first locations on base metal of equipment used in hydrocarbon facilities, wherein the first locations comprise locations that are identified as being susceptible to formation of microcracks due to high temperature hydrogen attack (HTHA) based on a history of the equipment, and wherein the removable sensors are attached to the equipment at elevated heights on the equipment using adaptable hybrid pads, the removable sensors detecting the microcracks by adhesion force based on a high-temperature suction substrate adhering up to a set temperature during an inspection processes;
    capturing, using the removable sensors and as captured surface data, surface data comprising surface temperatures, per hydrogen (pH) measurements, and methane measurements for methane escaping from external surfaces of the equipment;
    determining, using the captured surface data, a presence of the microcracks in the base metal;
    performing an HTHA susceptibility analysis of the equipment based, at least in part, on the presence of the microcracks and by analyzing the captured surface data;

mapping, based at least on the HTHA susceptibility analysis, potential HTHA microcracks and first methane formation locations presenting early signs of methane formation;

installing, using the at least one drone configured with the extended arm, the removable sensors at second locations on the base metal of equipment used in hydrocarbon facilities, wherein the second locations comprise locations that are identified as being susceptible to formation of the microcracks due to the HTHA based on a history of the equipment;

capturing, using the removable sensors and as the captured surface data, the surface data comprising the pH measurements, and the methane measurements for the methane escaping from external surfaces of the equipment;

determining, using the captured surface data, the presence of the microcracks in the base metal;

performing microcracks HTHA susceptibility analysis of the equipment based, at least in part, on the presence of the microcracks and by analyzing the captured surface data;

mapping, based at least on the HTHA susceptibility analysis, potential HTHA microcracks and second methane formation locations; and generating, using the captured surface data, an inspection result and a suggestion, the inspection result comprising a final analysis of assessment reports indicating a likelihood of microcracks propagation and a presence of fissuring inside the base metal and the suggestion comprising a modification of an operation of the equipment to prevent risks indicated by the inspection result.

9. The non-transitory, computer-readable medium of claim 8, wherein the removable sensors comprise a pulsed eddy current (PEC) array.

10. The non-transitory, computer-readable medium of claim 8, wherein the removable sensors comprise high-temperature suction skins including suction cups.

11. The non-transitory, computer-readable medium of claim 8, wherein capturing the surface data comprises using wireless communications of the surface data from the removable sensors to an onsite computer system.

12. The non-transitory, computer-readable medium of claim 8, wherein the first locations and second locations are selected using field inspection and engineers.

13. The non-transitory, computer-readable medium of claim 8, wherein capturing the surface data comprises recording, with the surface data for each removable sensor, a location on the equipment on which the removable sensor is installed.

14. The non-transitory, computer-readable medium of claim 8, the operations further comprising:
determining, based at least on an equipment history of the equipment, that the first locations comprise locations that are susceptible to HTHA.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
installing, using at least one drone configured with an extended arm, removable sensors at first locations on base metal of equipment used in hydrocarbon facilities, wherein the first locations comprise locations that are identified as being susceptible to formation of microcracks due to high temperature hydrogen attack (HTHA) based on a history of the equipment, and wherein the removable sensors are attached to the equipment at elevated heights on the equipment using adaptable hybrid pads, the removable sensors detecting the microcracks by adhesion force based on a high-temperature suction substrate adhering up to a set temperature during an inspection processes;

capturing, using the removable sensors and as captured surface data, surface data comprising surface temperatures, per hydrogen (pH) measurements, and methane measurements for methane escaping from external surfaces of the equipment;

determining, using the captured surface data, a presence of the microcracks in the base metal;

performing an HTHA susceptibility analysis of the equipment based, at least in part, on the presence of the microcracks and by analyzing the captured surface data;

mapping, based at least on the HTHA susceptibility analysis, potential HTHA microcracks and first methane formation locations presenting early signs of methane formation;

installing, using the at least one drone configured with the extended arm, the removable sensors at second locations on the base metal of equipment used in hydrocarbon facilities, wherein the second locations comprise locations that are identified as being susceptible to formation of the microcracks due to the HTHA based on a history of the equipment;

capturing, using the removable sensors and as the captured surface data, the surface data, the pH measurements, and the methane measurements for the methane escaping from external surfaces of the equipment;

determining, using the captured surface data, the presence of the microcracks in the base metal;

performing microcracks HTHA susceptibility analysis of the equipment based, at least in part, on the presence of the microcracks and by analyzing the captured surface data;

mapping, based at least on the HTHA susceptibility analysis, potential HTHA microcracks and second methane formation locations; and generating, using the captured surface data, an inspection result and a suggestion, the inspection result comprising a final analysis of assessment reports indicating a likelihood of microcracks propagation and a presence of fissuring inside the base metal and the suggestion comprising a modification of an operation of the equipment to prevent risks indicated by the inspection result.

16. The computer-implemented system of claim 15, wherein the removable sensors comprise a pulsed eddy current (PEC) array.

17. The computer-implemented system of claim 15, wherein the removable sensors comprise high-temperature suction skins including suction cups.

18. The computer-implemented system of claim 15, wherein capturing the surface data comprises using wireless communications of the surface data from the removable sensors to an onsite computer system.

19. The computer-implemented system of claim 15, wherein the first locations and second locations are selected using field inspection and engineers.

20. The computer-implemented system of claim 15, wherein capturing the surface data comprises recording, with the surface data for each removable sensor, a location on the equipment on which the removable sensor is installed.

* * * * *